Nov. 27, 1934.  O. L. GOETHEL  1,982,426
TRIPLE LOCK SPRING WITH FLOATING TOP
Filed Nov. 23, 1931
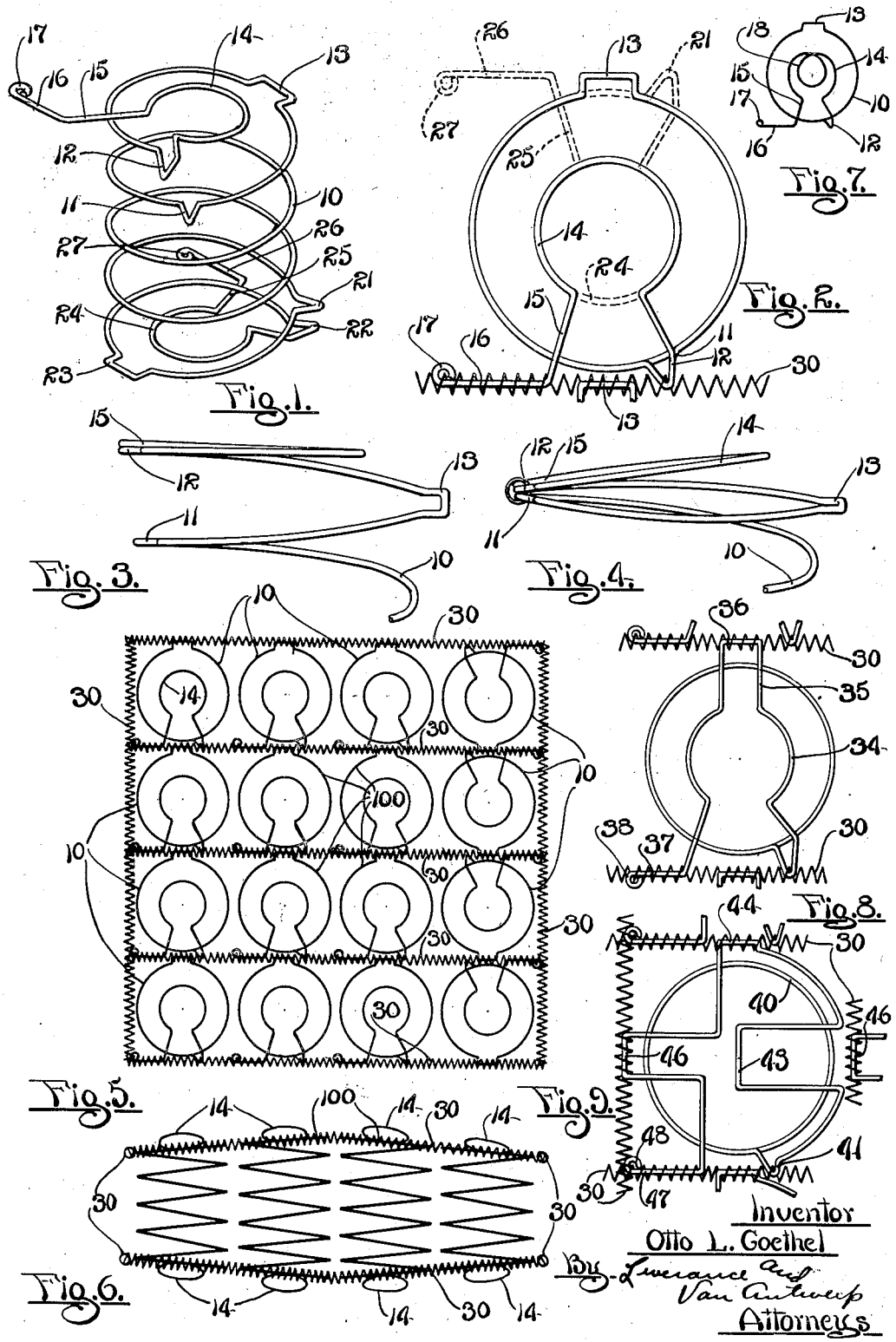
Inventor
Otto L. Goethel
By Lawrence and Van Antwerp
Attorneys Patented Nov. 27, 1934

1,982,426

UNITED STATES PATENT OFFICE 1,982,426

TRIPLE LOCK SPRING WITH FLOATING TOP

Otto L. Goethel, Grand Rapids, Mich.

Application November 23, 1931, Serial No. 576,658

4 Claims. (Cl. 5—269)

This invention relates to a spring unit and its assembly to form a new and improved spring assembly for beds, mattresses, automobile cushions and the like.

One objection to spring units of one kind as hitherto manufactured has been that it has been necessary to bend each end of the spring about the adjacent spiral thereof in order to form what is termed a lock or knot, this connection or lock preventing the spring from any uncoiling movement. Another kind of spring construction dispenses with the lock or knot connection but in so doing utilizes two types of spring units which, of course, increase the cost of manufacture of the spring. Another objection to springs, as usually manufactured, resides in the difficulty encountered in connecting the tops of the several springs together in order to prevent their creeping with respect to one another. Still another difficulty has been that the application of a force upon a small area of the spring, although the force may be very small, nevertheless is not resisted alone by the springs immediately therebelow but the adjacent springs are also immediately brought into effect and thus the resistance caused by the springs is entirely too much for proper and efficient flexing action thereof. In other words, if a child utilized the springs his weight would be resisted not only by the springs immediately below him but also by the adjacent springs.

Now, in my improved device I eliminate each of the above difficulties as well as secure other advantages which will be apparent as the description proceeds.

In the first place, I dispense with the lock, or knot, at the ends of the springs and this is advantageous because it makes the spring unit much easier to manufacture and furthermore there is no danger of slipping in my construction as might occur in the usual lock construction.

Although I do away with the lock, nevertheless I provide means which efficiently prevents the uncoiling action of the springs and this is accomplished by means of the usual helical connectors which extend entirely across the spring structure, these helical connectors or springs extending between toes on the upper part of the coil and the end of the coil and thus preventing any uncoiling movement whatsoever.

Secondly, I connect the several spring units together by means of helical springs whereby they are always maintained in the same position relatively to each other and there is no danger of them being permanently distorted therefrom.

Thirdly, I provide a floating top for each of the springs, these floating tops being initially pressed downwardly upon the application of any weight upon the spring and these tops acting absolutely independently of each other whereby, when a small object is placed upon a spring, such as a small child, the initial movement of the spring will be confined to only those floating tops which are located immediately below the object placed thereon. Hence, when a light object is placed upon the spring, even when it is between two much heavier persons, it will be met by only a very slight resistance and thus a very springy action will be obtained for all three of the persons.

Attention is especially directed to my novel locking means for the spring units, the helical connecting the two toes of the upper adjacent coils of the springs together whereby the spring is kept from uncoiling, and onto the end of the coil to prevent spreading of the upper floating tops of the springs.

The helical also extends around the heel of the adjacent spring whereby the two springs are fastened together. It is to be noted that the connection of the two toes of the spring causes the floating top to extend upwardly at a slight angle whereby it lies above the upper plane of the several spring units and thus functions as previously described.

Further advantages and meritorious qualities will become apparent to one skilled in this art as the description proceeds.

In the drawing:—

Fig. 1 is a perspective view of my improved spring unit.

Fig. 2 is a plan view looking downwardly upon Fig. 1.

Fig. 3 is a side elevation of the upper portion of the spring unit.

Fig. 4 is a view similar to Fig. 3, this view illustrating the helical spring holding the upper two coils of the spring together at one side thereof.

Fig. 5 is a plan view of a construction formed by assembling several of my novel spring units.

Fig. 6 is a view in cross section through Fig. 5, this view illustrating the manner in which the central spring units are made of greater height than those located at the edge of the construction.

Fig. 7 is a plan view of a modification, this view being drawn to a small scale and merely illustrating the extra looped portion in the floating part of the spring.

Fig. 8 is a modification in which the connection between the several spring units is slightly changed.

Fig. 9 is another modification.

Similar numerals refer to similar parts throughout the several views.

Referring to the drawing, numeral 10 designates a coil spring which has bent out toe portions 11 and 12 in its upper two loops and a heel portion 13 oppositely located therebetween, the upper toe portion 12 being continued in a circular floating portion 14, the wire forming the spring extending outwardly in an angular portion 15 and terminating in an arm 16 which has a small portion 17, such as a hook, at its outer end.

Similarly, the lower end of the spring has toe portions 21 and 22, a heel portion 23, a floating portion 24, an angular portion 25, an arm portion 26 and a projecting portion 27.

It will be noted that the spring unit is reversible, that is, the same may be inverted without changing its appearance.

Referring now to Figs. 5 and 7, numeral 30 denotes helical connectors or springs, these springs being of spiral construction as shown and being threaded through the toe and heel portions of the springs thereby locking them together. The helicals 30, please see Figs. 2 and 4, are threaded through the toes 11 and 12 and thus the upper portions of the spring units assume the shape shown in Fig. 4. That is, the circular portion 14 extends upwardly at an angle to the plane of the top of the spring and this portion 14 is resiliently held in such a position and this portion 14 is not connected to any adjacent springs and hence its flexing is entirely independent therefrom. The helical 30 continues and extends around the heel portion 13 and then along the arm 16. The projection 17 prevents movement of the arm 16 relative to the helical.

From the above it will be seen that the helical spring 30 performs several distinct functions. In the first place it holds the upper two coils of the springs together thus causing the floating portion 14 to assume its proper position.

In the second place it maintains the heel 13 properly spaced between the toes 12 and 11 and the portion 16.

In the third place it is associated with the projection 17 on the arm 16 to prevent movement of the portion 14 outwardly and thus maintains it in its proper form. The connecting together of the toes 11 and 12 prevents any tendency of the springs to uncoil and this connection makes needless the usual lock or knot connection on springs of this character.

Referring to Fig. 5, numeral 100 indicates spring units which are similar to the ones shown in Fig. 1 except an extra coil is inserted whereby they are of greater height thus causing a bulging of the spring construction near its central portion as is clearly shown in Fig. 6.

The modification shown in Fig. 7 is also very similar to that shown in Fig. 1, the only difference being the additional extra coiled or looped portion 18 which supplements the floating portion 14 and prevents any of the padding of the structure from being forced downwardly inside of the coiled spring. Also, the extra loop 18 gives an increased height and resiliency to the upper spring portion, such being sometimes desirable.

Fig. 8 discloses a modified form of spring in which the portion 34 is only partly floating and is continued in a U-shaped extension 35 which forms a heel 36 which serves similarly to the heel 13, that is, for connecting the several spring units together. Also, the portion 34 is continued outwardly in an arm 37 which terminates in a projection 38, this projection or loop being faced outwardly instead of inwardly as is the loop 17 shown in Fig. 1.

Referring to Fig. 9, 40 indicates a coil spring which has a toe 41 therein, similarly to the toe 12, shown in Fig. 1, and is then continued in an inwardly extending floating portion 43 and then a heel portion 44 is formed similarly to the heel portions 36 and 13, previously referred to, and an additional heel portion 46 is formed in alinement with the floating portion 43. The wire forming the coil terminates in an arm 47 having a hook 48.

From the above description it will be appreciated that I have inventively created a spring unit which is admirably suited for the purpose intended. The spring unit is easy to manufacture as it has no difficult portions thereon to be bent to shape, such as the locks on structures of this character, and the unitary projection from the spring renders it very easy to connect onto adjacent springs whereby a unit structure is formed. Furthermore, the springs may be easily and quickly replaced as desired.

The invention is defined in the appended claims and is to be considered comprehensive of all forms of structure coming within their scope.

I claim:

1. A spring unit of the class described comprising a coil spring having outwardly bowed portions in the two upper convolutions thereof, said convolutions normally being in spaced relationship due to the resiliency of the spring, the wire forming the spring then extending inwardly toward the central portion of the coil, then laterally to form a looped portion and then outwardly with respect to the central portion of the coil, said extending portions being above the upper convolution in the plane of the end of the spring to form a floating portion, and means for pulling the outwardly bowed portions toward one another whereby the floating portion separates itself from the plane of the end of the spring and hence serves as an auxiliary spring.

2. A spring organization of the class described, comprising, a series of spring units located in rows, each spring unit comprising a coiled element having toe portions in each of its upper two coils, said element continuing above the upper two coils inwardly and then outwardly to form a loop and then terminating in a free end and helicals extending between the several rows, said helicals connecting onto the several toe portions to compress said upper two coils and thereby cant the several loops.

3. A spring organization as set forth in claim 2 in which the helicals are also connected onto the said free ends.

4. A spring organization as set forth in claim 2 in which each coiled element has a heel portion intermediate the toe portions, said heel portion being fastened onto the respective adjacent helical between the free end and the toe portions of the adjacent coiled element.

OTTO L. GOETHEL.